(12) United States Patent
Arazaki

(10) Patent No.: US 10,032,097 B2
(45) Date of Patent: Jul. 24, 2018

(54) IMAGE PROCESSING DEVICE, IMAGE PROCESSING METHOD, AND CONTROL PROGRAM

(71) Applicant: SEIKO EPSON CORPORATION, Tokyo (JP)

(72) Inventor: Shinichi Arazaki, Fujimi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/689,981

(22) Filed: Aug. 29, 2017

(65) Prior Publication Data
US 2018/0068208 A1 Mar. 8, 2018

(30) Foreign Application Priority Data
Sep. 6, 2016 (JP) ................................ 2016-173387

(51) Int. Cl.
*G06K 15/02* (2006.01)
(52) U.S. Cl.
CPC ..... *G06K 15/1857* (2013.01); *G06K 15/1823* (2013.01); *G06K 15/1836* (2013.01); *G06K 15/1843* (2013.01)
(58) Field of Classification Search
CPC ........... G06K 15/1857; G06K 15/1823; G06K 15/1836; G06K 15/1843
See application file for complete search history.

(56) References Cited

U.S. PATENT DOCUMENTS

| 6,246,488 B1* | 6/2001 | Murata ................. G06K 15/12 358/1.14 |
| 6,266,446 B1* | 7/2001 | Rengakuji ................ G06T 9/00 348/441 |
| 2009/0041116 A1* | 2/2009 | Kondo ................. H04N 1/1911 375/240.01 |
| 2014/0313251 A1* | 10/2014 | Kakutani ............. H04N 1/4051 347/9 |

FOREIGN PATENT DOCUMENTS

| JP | 2005-174139 | 6/2005 |
| JP | 2007-087191 | 4/2007 |

* cited by examiner

*Primary Examiner* — Moustapha Diaby
(74) *Attorney, Agent, or Firm* — Workman Nydegger

(57) ABSTRACT

A storage section configured to store image data of a raster form therein, a processing section configured to process the image data in a unit of an image block having a predetermined block size in a raster direction, and a control section configured to provide the processing section with information related to the block size and an image size are provided, and the processing section performs counting from the beginning of the image data, and obtains, in a lump, from the storage section, image data corresponding to Wb pixels that are successive from an N-th pixel represented by N=(n−1)Wa+(m−1)Wb+1, wherein Wa and Wb respectively denote the image size and the block size in the raster direction, m and n denote parameters for specifying the location of an image block.

10 Claims, 8 Drawing Sheets

IMAGE PROCESSING DEVICE, IMAGE PROCESSING METHOD, AND CONTROL PROGRAM

BACKGROUND

1. Technical Field

The present invention relates to a technology for processing image data of a raster form.

2. Related Art

For example, like a technology that allows image data generated by an optional image editing application to be converted into data processable by a printing apparatus, a technology that allows image data representing an image to be data processed and converted into new image data is sometimes required. For such a technology, in most cases, an identical process is applied to each pixel constituting an image. In this case, allowing the process on each pixel to be sequentially performed results in repeated processes having a huge arithmetic operation amount, and thus, in order to allow the processes to be efficiently performed, a method that allows an image to be divided into a plurality of image blocks and allows processes on the respective image blocks to be executed in parallel is employed.

The size of each of the image blocks is preferable to be determined in accordance with the processing ability of a data processing device. Meanwhile, the size of the image changes for each image, and a situation where it is difficult to divide one image into image blocks all of which have the same size occurs. In order to solve this problem, in technologies disclosed in JP-A-2007-087191 and JP-A-2005-174139, dummy pixels are added to the end portion of an image so as to allow the size of the image to correspond to the integer multiple of a block size, and then, the image is divided into a plurality of blocks.

In the above conventional technology, before the start of processes on image data, it is necessary to prepare image data for which an image size has been adjusted, and this causes overhead that brings about the increase of a processing time. Further, it is necessary to make a change between processes in accordance with the relations between the image size and block sizes, and, for example, when the enhancement of the efficiency of parallel processes between image blocks or within an image block is intended, this may become a problem.

As described above, in the conventional technology, there remains a problem in that it is difficult to achieve further shortening of a time needed to perform data processing.

SUMMARY

An advantage of some aspects of the invention is that, in technologies for processing image data of a raster form, a technology that enables processing in a unit of an image block to be efficiently performed regardless of an image size is provided.

According to an aspect of the invention, a storage section configured to store therein image data representing an image and represented in a raster form, a processing section configured to process the image data in a unit of an image block having a predetermined block size in a raster direction, and a control section configured to provide the processing section with information related to the block size and an image size of the image are provided, and the processing section performs counting from the beginning of the image data to determine a starting end corresponding to an N-th pixel represented by a formula described below, and obtains, in a lump, from the storage section, pieces of image data included in the image data and corresponding to a pixel row including successive pixels whose number is equal to Wb to process the pieces of image data.

Further, according to another aspect of the invention, a processing section obtains image data that is stored in a storage section and that represents an image and is represented in a raster form, and the processing section processes the image data in a unit of an image block having a predetermined block size in a raster direction. Further, the processing section performs counting from a beginning of the image data to determine a starting end corresponding to an N-th pixel represented by a formula described below, and obtains, in a lump, from the storage section, pieces of image data included in the image data and corresponding to a pixel row including successive pixels whose number is equal to Wb to process the pieces of image data.

Further, according to another aspect of the invention, a control program executable by a device including a storage section configured to store image data therein, a processing section configured process the image data, and a control section configured to control the processing section allows the storage section to store therein image data representing an image and represented in a raster form, allows the processing section to obtain the image data from the storage section and process the obtained image data in a unit of an image block having a predetermined block size in a raster direction, and allows the control section to provide the processing section with information related to the block size and an image size of the image. Further, in the obtaining of the image data from the storage section by the processing section, the control program allows the processing section to perform counting from a beginning of the image data to determine a starting end corresponding to an N-th pixel represented by a formula described above, and obtain, in a lump, pieces of image data included in the image data and corresponding to a pixel row including successive pixels whose number is equal to Wb.

Here, the formula representing the above value N is as follows:

$$N=(n-1)Wa+(m-1)Wb+1$$

In this formula, Wa denotes the image size in the raster direction, Wb denotes the block size in the raster direction, m denotes a natural number not exceeding a minimum natural number among natural numbers each being larger than or equal to a number resulting from dividing Wa by Wb, n denotes a natural number not exceeding the image size in an intersection direction intersecting with the raster direction, and unit of each of the image size and the block size is a pixel number.

It should be noted that, in the present specification, the "raster direction" is defined as follows: That is, in image data of a raster form, an image is regarded as an aggregate of pixels arranged in a grid shape, and a piece of pixel information associated with each of the pixels is sequentially written in accordance with order of the arrangement of the pixels within the image. An extension direction of pixel rows formed by sequentially arranging a pixel in accordance with order of the writing of the pieces of pixel information in image data rows is referred to as the "raster direction".

In the aspect of the invention, having been configured in such a way as described above, in the image data written in a raster form, the processing section obtains, in a lump, pieces of image data each associated with a corresponding one of successive pixels from the storage section. In the image data of a raster form, a piece of pixel information representing each of pixels constituting the image is sequentially written in order in accordance with order of the arrangement of pixels within the image. Thus, pieces of successive image data whose number corresponds to the block size of an image block in the raster line are obtained in a limp. With this configuration, it is achieved to obtain pieces of image data needed for processing inside the relevant image block in a short time, as compared with a case where individual pieces of image data are individually obtained.

The size of the image size is not always the integer multiple of the size of the image block. When, however, a 1st pixel corresponding to the beginning of the image data is defined as a 1st pixel, and counting of the number of the pixels is performed, an N-th pixel represented by the above formula corresponds to an upstream-side end of one image block in the raster direction, regardless of the relation between the image size and the block size. This reason will be described in detailed in "DESCRIPTION OF EXEMPLARY EMBODIMENTS" below.

Accordingly, when a configuration that allows pieces of successive image data whose starting end corresponds to the above pixel and whose number is equal to Wb, which is the size of the image block, to be obtained in a lump is employed, as a result, it is achieved to obtain all pieces of image data each associated with a corresponding one of pixels included in one pixel row corresponding to the one image block. In the case where, however, the image size is not the integer multiple of the image block, as a result, an image block including image data corresponding to pixels whose number is smaller than the block size appears at an end in the raster direction in one raster line.

In the image data of a raster form, immediately after a piece of pixel information associated with a pixel corresponding to the end in the raster direction in the one raster direction, a piece of pixel information associated with a beginning pixel of a next raster line in the raster direction is subsequently written. Accordingly, even in the case where the end of an image block and the end of the image do not correspond to each other, when pieces of successive image data associated with pixels whose number is equal to the block size is obtained, as a result, pieces of image data in a beginning portion of the next line are included. In other word, as a result, the pieces of image data in the beginning portion of the next line are automatically added as if the pieces of image data were dummy data.

As described in JP-A-2007-087191, unnecessary pieces of image data resulting from processing using the dummy data can be deleted afterword, and thus, there is no influence on the image. Accordingly, without any particular process to add the dummy data, the same advantageous effects as those in a case where the dummy data is added are brought about.

Here, in the case where a pixel next to the pieces of pixels having been added, as the dummy data, to the last image block is regarded as a pixel corresponding to the starting end of a next image block, as a result, a discrepancy with respect to the location of the starting end occurs, and pieces of image data falling within a range in accordance with a delimiter different from that of an original image block are obtained. In this regard, however, as described below, according to the above formula, a pixel corresponding to the starting end of a next image block corresponds to a beginning pixel of a next raster line. Accordingly, a problem, that is, the occurrence of discrepancies between delimiters of obtained pieces of image data and corresponding delimiters of image blocks, does not occur.

As described above, according to the invention, when the image data of a raster form is processed in a unit of an image block, the above-described configuration enables, regardless of whether or not the image size is the integer multiple of the block size, the location of a pixel corresponding to the upper-stream side end of any image block in the raster direction to be specified in the pieces of image data through single processing. Thus, it is achieved to obtain pieces of image data corresponding to any image block to be processed from image data stored in the storage section in a short time. Further, the content of processes does not depend on the relation between the image size and the block size, and thus, the above-described configuration is suitable for the parallelization of processes, and enables the achievement of the efficiency and the speeding-up of processes.

In the aspect of the invention, the storage section may be configured to store therein the image data having a structure in which a data row in which pixel information per pixel is sequentially arranged in order in accordance with order of an arrangement of pixels in one of raster lines is sequentially arranged in order in accordance with order of an arrangement of the raster lines. One "raster line" means a straight line represented by a row of pixels that align from one end up to the other end of an image in the raster direction. According to the above-described configuration, immediately after an arrangement of pieces of image data each associated with a corresponding one of pixels on one raster line, pieces of image data each associated with a corresponding one of pixels are arranged on a next raster line, and thus, the above-described method that allows pieces of image data included in a next image block to be handled as dummy data functions particularly effectively.

Further, the processing section may be configured to execute a plurality of threads in parallel to process pieces of image data each associated with a corresponding one of pixels within an image block. The above-described method does not depend on the relation between the image size and the block size, and enables the same processing to be applied regardless of the location of an image block targeted for the processing within an image. Thus, the above-described method is suitable for parallel processes, and enables the achievement of high-speed data processes on individual pixels within any image block though the parallel processes by a plurality of threads.

Further, the processing section may be configured to include a plurality of operation cores each of which executes one or more threads using pieces of image data obtained from the storage section. As a device having such a configuration, various types of Graphics Processing Units (GPUs) have been made into products, and such GPUs are suitably applicable to image data processing. The configuration that allows such a GPU device to execute the above parallel processes enables image data to be processed at a high speed.

Further, the control section may be configured to provide the processing section with information for use in specifying an image block to be processed. This configuration allows an image block to be processed within an image be specified on the basis of the information provided by the control section, and thus, enables the processing section to process any image block using the information provided by the control section. A combination (m, n) of natural numbers in the above formula is information representing the location on an image with respect to a pixel row corresponding to pieces of image data desired to be obtained. Thus, upon designation of an image block targeted for processing, a combination (m, n) of natural numbers can be specified, thereby enabling the processing section to grasp the location of pieces of image data to be obtained on the basis of specified values m and n.

Further, the control section may be configured to allow the block size to be changeable and settable. This configuration enables unit of processing with respect to an image to be changed in accordance with an object, and thus, enables various images to be efficiently processed. Even though the block size is changed, the above formula itself for obtaining the location of a starting end of a pixel row is not changed, it is unnecessary to change the processing to be executed by the processing section.

Further, when the block size in the intersection direction is represented in a unit of a pixel number and is denoted by Hb (Hb being a natural number larger than or equal to "2"), the processing section may be configured to obtain, from the storage section, pieces of image data included in the image data and corresponding to pixel rows whose number is equal to Hb, and among which locations of starting ends of every two adjacent pixel rows differ from each other by Wa. When the image block has a block size corresponding to a plurality of pixels in the intersection direction, the relevant image block includes a plurality of pixel rows that are mutually discretely written in the image data. Since the locations of the starting ends of every two adjacent pixel rows among the pixel rows differ from each other by the image size in the raster direction, pieces of image data corresponding to one image block can be collected by obtaining pieces of image data corresponding to pixel rows corresponding to a length Hb and having a such a relation. It is unnecessary to apply the above formula to each of the pixel rows and calculate a corresponding starting end direction.

Further, the image processing device according to the aspect of the invention may further include a printing section configured to perform printing based on printing data that the processing section has processed image data and has generated. Processing for converting image data into printing data appropriate to printing is particularly suitable as a target of the application of parallel processes. Applying the invention to processing for generating such printing data enables image data to be converted into the printing data at a high speed.

It should be noted that all of the plurality of constituent elements included in the above-described individual aspects of the invention are not essential, and in order to solve part of or the whole of the above problems, or achieve part of or the whole of advantageous effects described in this specification, changes, deletions, replacements with new other constituent elements, and partial deletions of limitations are optionally applicable to partial constituent elements among the plurality of constituent elements. Further, in order to solve part of or the whole of the above problems, or achieve part of or the whole of advantageous effects described in this specification, part of or the whole of technical features included in one of the above-described aspects of the invention may be combined with part of or the whole of technical features included in any other one of the above-described aspects of the invention to achieve an independent aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
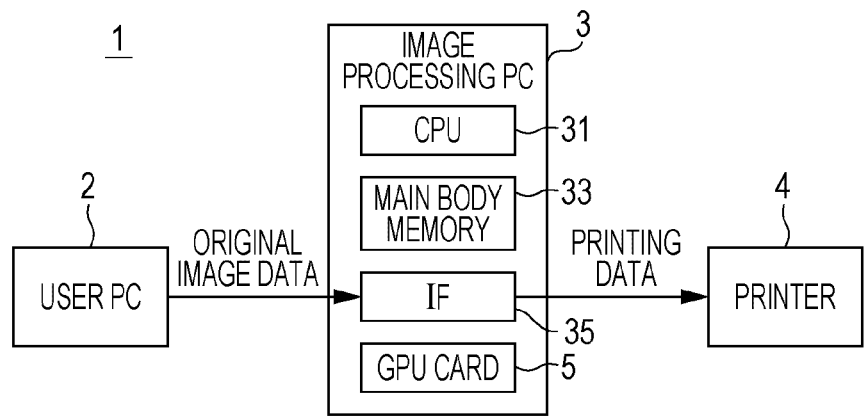
FIG. 1 is a block diagram illustrating an example of the configuration of a printing processing system to which the invention is applicable.

FIG. 1 is a block diagram illustrating an example of the configuration of a printing processing system to which the invention is applicable. A printing processing system 1 includes a user's personal computer (hereinafter abbreviated and referred to as a "user PC") 2, an image processing personal computer (hereinafter abbreviated and referred to as an "image processing PC") 3, and a printer 4, these components being communicably connected to one another. This printing processing system 1 is a system in which a user allows the printer 4 to operate and print desired images.

Specifically, a user desiring to print images uses an appropriated image editing application executed by the user PC2 to generate original image data representing the images, which the user desires to print. The original image data is transmitted to the image processing PC3. The original image data is converted into printing data usable by the printer 4 by allowing an image processing application mounted in the image processing PC3 to execute data processing. The printing data is transmitted from the image processing PC3 to the printer 4, and the printer 4 executes a printing job upon receipt of the printing data, thereby allowing images corresponding to the original image data to be printed.

The user PC2 is a computer device having a hardware configuration similar to that of a commonly-used personal computer or workstation. The image processing PC3 also has a similar hardware configuration, and includes components particularly related to an embodiment of the invention, such components being a Central Processing Unit (CPU) 31, a main body memory 33, an interface (IF) 35, and a Graphics processing Unit (GPU) card 5. The CPU 31 executes a predetermined control program to control operations of the entire image processing PC3. The interface 35 communicates with external devices. For example, the interface 35 plays the roles of receiving the original image data from the user PC2 and transmitting the printing data to the printer 4.

Further, the main body memory 33 stores and retains therein various programs executed by the CPU 31 as well as data generated by the execution of the programs. The main body memory 33 is similar to a main memory mounted in a commonly-used personal computer, but herein is particularly referred to as a "main body memory" so as to be distinguished from a device memory mounted on the GPU card 5, which will be described below.

The GPU card 5 has a hardware configuration specialized to image data processing, as described subsequently, and performs the function of generating the printing data in a short time by applying parallel processes to arithmetic operations on individual pixels when generating the printing data from the original image data in response to a control instruction from the CPU 31.

Figure 2:
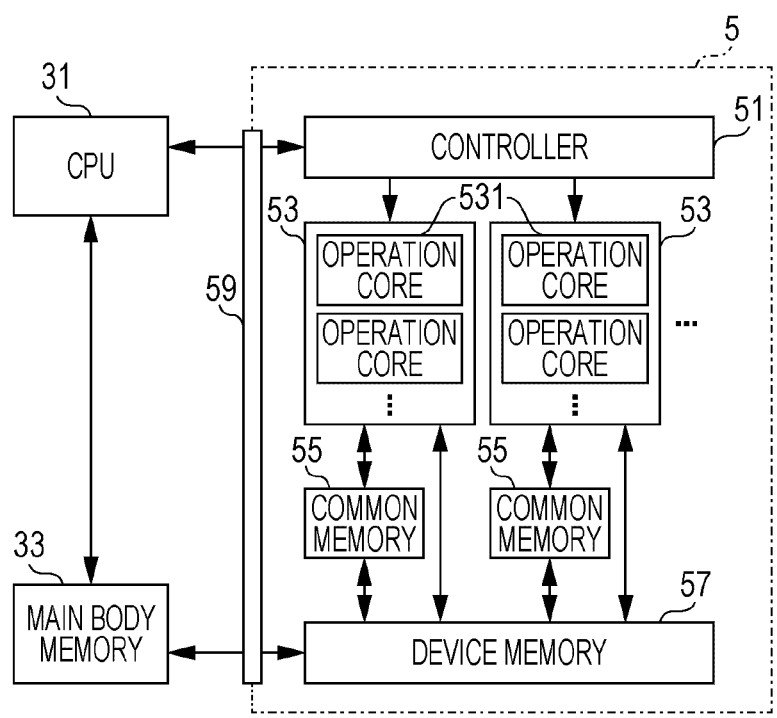
FIG. 2 is a diagram illustrating an example of the configuration of a GPU card.

FIG. 2 is a diagram illustrating an example of the configuration of the GPU card 5. The GPU card 5 is a card module including a connector 59, that is, a connector attachable into an expansion slot (not illustrated) of the image processing PC3, and is attached to the image processing PC3 to allow the image processing PC3 to expand its function. Note that individual components that are included in the GPU card and that will be described subsequently are mounted on such a module attachable/detachable to/from the image processing PC3, but may be incorporated in the image processing PC3 in advance. Further, a plurality of such modules may be mounted in the image processing PC3. Further, the figure of each of such modules encompassing a GPU is not limited to such a card feature, but may be optionally designed.

The GPU card 5 includes a controller 51. This controller 51 is communicably connected to the CPU 31 via the connector 59. The controller 51 controls the operations of individual sections inside the GPU card 5 on the basis of control programs and various processing parameters that are received from the CPU 31. The controller 51 is connected to a plurality of operation core sets 53, and each of the operation core sets 53 includes a large number of operation cores 531. Each of the operation core sets 53 is connected to a common memory 55, and this common memory 55 is shared by the operation cores 531 included in the each operation core set 53. Further, the operation core sets 53 are also connected to a device memory 57, which will be described below.

The individual operation cores 531 execute arithmetic operations in parallel based on a common arithmetic algorism provided by the controller 51 and data sets individually read from the common memory 55 and the device memory 57, and write the results of the arithmetic operations onto the common memory 55. Each of the operation cores 531 has a hard configuration particularly specialized to high-speed execution of a relatively simple arithmetic operation. Among GPUs having been made into products, there are some GPUs each including, for example, several hundreds to several thousands of operation cores 531 per operation core set 53.

The plurality of operation cores 531 included in one operation core set 53 execute identical processes in parallel. When arithmetic algorisms provided to the mutually different operation core sets 53 by the controller 51 are identical to one another, as a result, all of the operation cores 531 on the GPU card 5 execute identical processes in parallel. As described above, the GPU card 5 has a configuration suitable for high-speed execution utilizing parallel processes by the large number of operation cores 531 with respect to arithmetic operations that are just repeated processes of an identical process, but have a huge arithmetic operation amount. Such a configuration is particularly suitable for image data processing in which an identical arithmetic operation is required to be executed on all pixels.

Further, the GPU card 5 includes the device memory 57. The device memory 57 is capable of carrying out data transfers with the main body memory 33 via the connector 59. The original image data, which the image processing PC3 has received from the user PC2, is stored and retained in the main body memory 33, and upon start of processing on the original image data by the GPU card 5, the original image data retained in the main body memory 33 is copied onto the device memory 57. Since a data transfer from the main body memory 33 is significantly slow compared with a high-speed arithmetic operation by the GPU card 5, the speeding-up of memory accesses during the execution of the arithmetic operations is intended by copying the original image data onto the device memory 57 of the GPU card 5 in advance.

The data transfer between the main body memory 33 and the device memory 57 is carried out by means of Direct Memory Access (DMA). In this case, in order to achieve a high transfer speed, the data transfer is preferably to be carried out in a way that allows as many pieces of data as possible to be transferred in a lump. In this case, the pieces of data are successive pieces of data having consecutive addresses on the main body memory 33. Thus, the whole of the original image data corresponding to the whole of an image to be printed is transferred to the device memory 57 in a lump as it is or for each of bands resulting from appropriately dividing the whole of the original image data.

The common memory 55 has a small storage capacity, but the speed of an access to the common memory 55 from each of the operation cores 531 is much higher than the speed of an access to the device memory 57 from each of the operation cores 531. A configuration that allows partial data included in data stored in the device memory 57 and used in a process by each operation core set 53 to be transferred to a corresponding common memory 55 located closest to the each operation core set 53 in advance enables achievement of a memory access whose speed is high enough for the processing speed of the each operation core set 53. Further, a configuration that allows pieces of data, such as processing parameters, used by each operation core 531 a plurality of times to be stored in a corresponding common memory 55 enables achievement of increasing the speed of the entire process by the each operation core 531.

Figure 3:
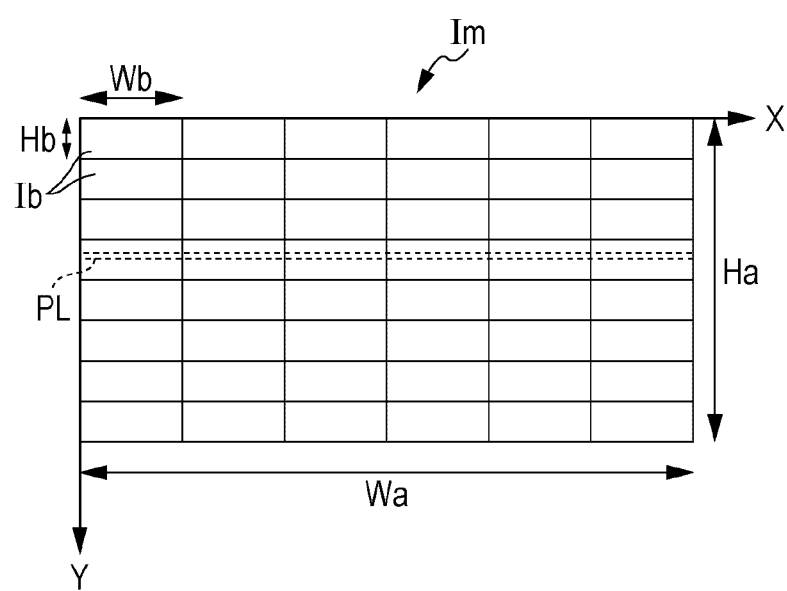
FIG. 3 is a diagram illustrating an example of an image having been divided into image blocks.

FIG. 3 is a diagram illustrating an example of an image having been divided into image blocks. Any image Im is represented in a way that allows a pixel to be mapped to each position on a two-dimensional image plane. Here, it is assumed that individual pixels are mapped onto an image plane on which its origin is located at the upper-left position of the image Im, its X-direction corresponds to the horizontal direction of the image Im, and its Y-direction corresponds to the vertical direction of the image Im. The location of each pixel is specified by the combination of an X coordination value and a Y coordination value. The image Im has a horizontal (X-direction) expansion corresponding to Wa pixels and a vertical (Y-direction) expansion corresponding to Ha pixels. In other words, when an image size is represented in a unit of a pixel number, the image size of the image Im is represented by a horizontal-direction image size "Wa" and a vertical-direction image size "Ha".

It is assumed that the image data is described in a raster form. That is, the image Im is represented by data having a structure in which a pixel row PL obtained by aligning Wa pixels in the X-direction is arranged in the Y-direction by Ha rows. The image data representing the image Im has a form in which pixel information per pixel is written in order in accordance with order of an arrangement of pixels, that is, order in which pixels are arranged from the left end toward the right end of the image Im, or order in which pixels are arranged from the top end toward the bottom end of the image Im. In this specification, the X-direction in this case is referred to as a "raster direction", and a straight line shaped image represented by one image row PL composed of pixels aligned in the X direction corresponds to one raster line. Further, the Y-direction intersected with the X-direction corresponds to the "intersection direction."

Such an image Im is divided into image blocks Ib having the same size. One image block Ib has a horizontal expansion corresponding to Wb pixels and a vertical expansion corresponding to Hb pixels. That is, when the size of the image block Ib is represented in a unit of pixel number, the size of the image block Ib is represented by a horizontal-direction block size "Wb" and a vertical-direction block size "Ha". When the individual image blocks Ib are needed to be distinguished from one another, each of the image blocks Ib can be specified by coordinate values representing a specific location representative of the each image block Ib, such as the location of the upper-left corner of the each image block Ib, or the location of the gravity point of the each image block Ib. Further, each of the image blocks Ib is sequentially denoted by a corresponding specific note number in accordance with order of the arrangement of the each image block Ib, thereby enabling the each image block Ib to be distinguished from any other image block Ib.

Each of the plurality of operation core sets 53 processes one of the image blocks Ib. Further, upon completion of the process on the one of the image blocks, the each operation core set 53 executes another one of the image blocks Ib. In this way, the image blocks Ib are processed one by one, and finally when processes on all of the image blocks Ib have been completed, this means the completion of processing on the entire image Im.

Figure 4:
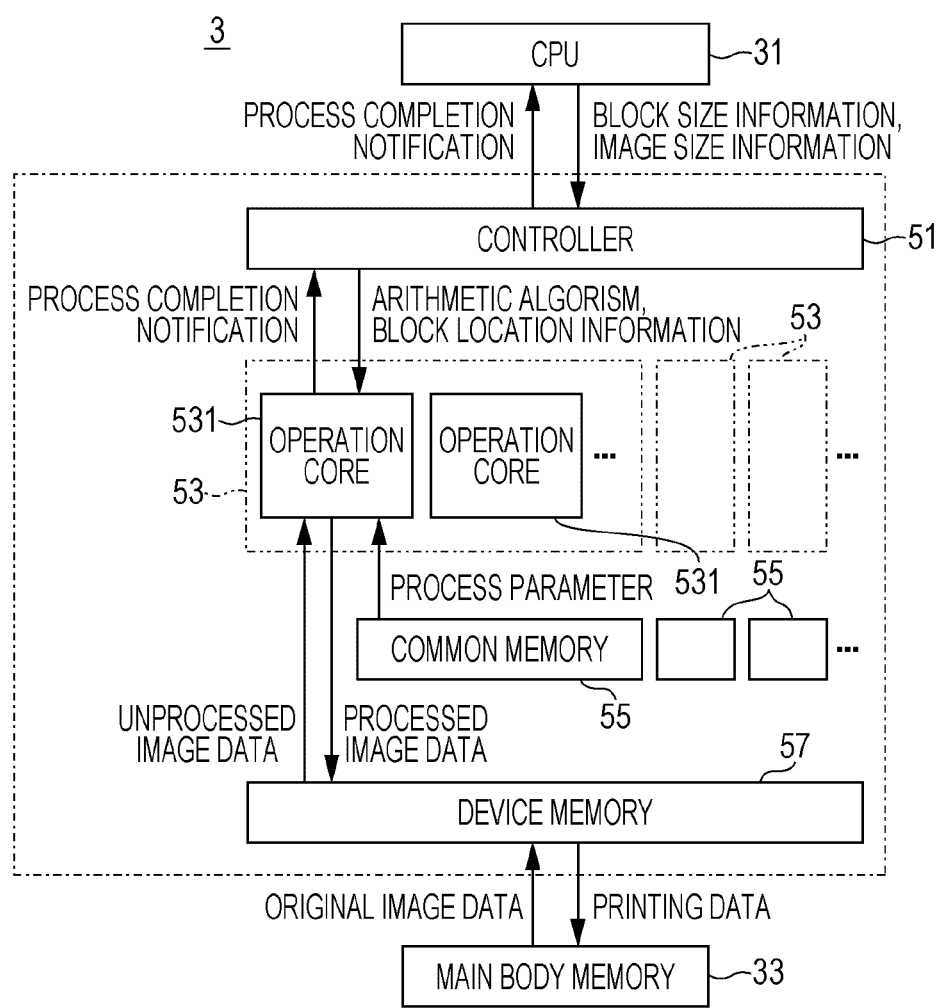
FIG. 4 is a diagram schematically illustrating a data flow in data processing by a GPU card.

FIG. 4 is a diagram schematically illustrating a data flow in data processing by a GPU card. In a data process of generating printing data from original image data, the original image data stored in the main body memory 33 is copied onto the device memory 57 of the GPU card 5. Further, the printing data having been generated inside the GPU card 5 is finally copied from the device memory 57 onto the main body memory 33.

With this configuration, in the image processing PC3, the original image data stored in the main body memory 33 can be converted into the printing data, and the configuration that allows the GPU card 5 to execute the arithmetic operation enables the CPU 31 to execute other processes while the arithmetic operation is being performed. Such a configuration that allows the CPU 31 superior in a general-purpose processing ability and the GPU card 5 superior in a parallel arithmetic operation ability to be assigned processes suitable for their respective features brings about a high processing ability as the whole of the system.

Figure 5:
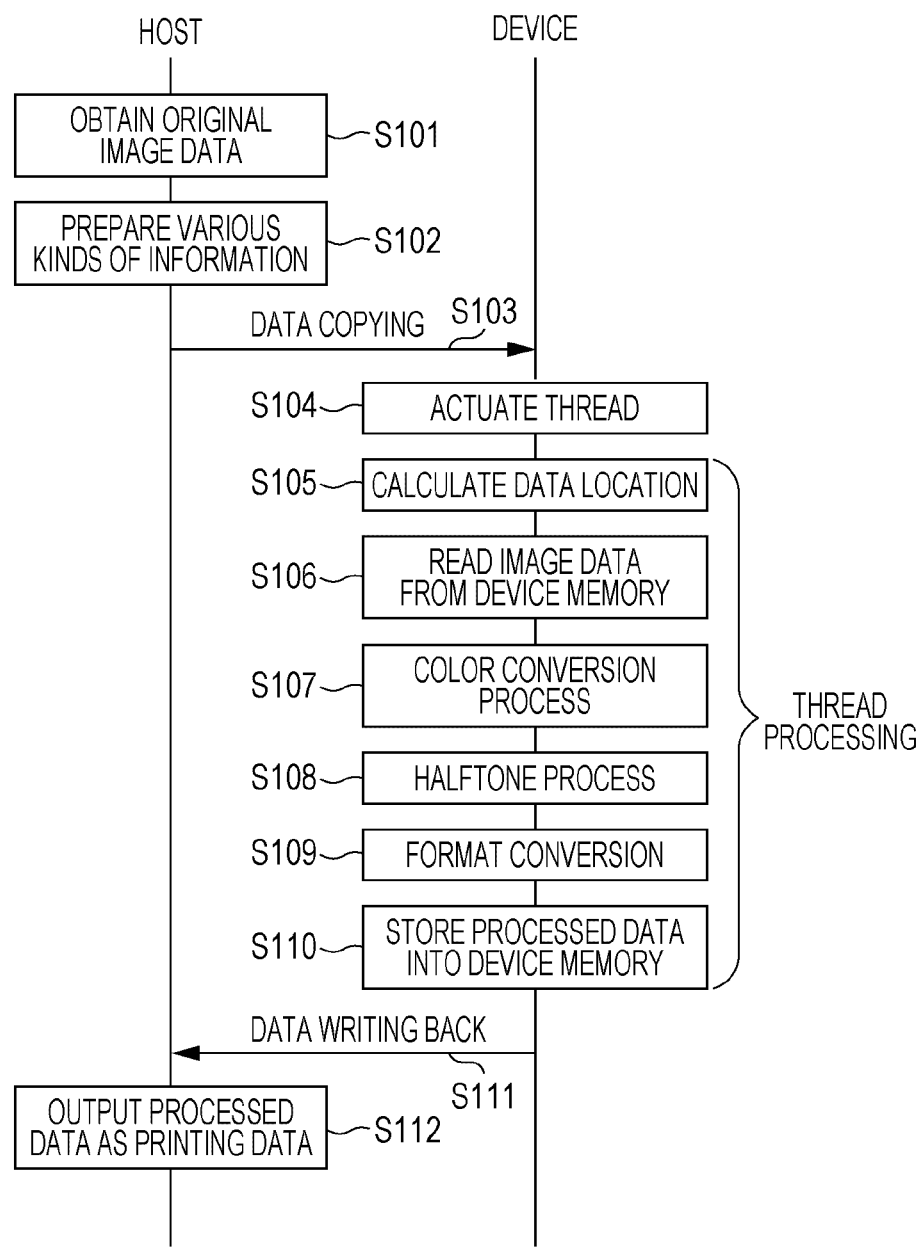
FIG. 5 is a diagram schematically illustrating a flow of data processing by an image processing PC.

FIG. 5 is a diagram schematically illustrating a flow of data processing in an image processing PC. In FIG. 5, individual components mounted in the main body of the image processing PC3, that is, the CPU 31, the main body memory 33, the interface 35, and any other component, are collectively referred to as a "host", and the individual components on the GPU card 5 are collectively referred to as a "device". In the configuration in which the GPU card 5 is connected to the image processing PC3 via the connector 59, individual components located at the main body side of the image processing PC3 from the connector 59 correspond to the host. The data transfer between the host and the device is carried out via the connector 59.

The data flow within the image processing PC3 will be described in more detail with reference to FIGS. 4 and 5. When the host has received original image data from the user PC2 via the interface 35 (step S101), the host executes image data processing for generating printing data from the original image data. The CPU 31 prepares various kinds of information, such as image size information about the size of an image to be processed, and block size information about the size of an image block (step S102).

The original image data having been stored in the main body memory 33 and the information having been prepared by the CPU 31 are transferred to the device (step S103). Specifically, the various kinds of information are provided to the controller 51, and the original image data is copied onto the device memory 57. Based on the provided information, the controller 51 grasps not only the size of the image and the size of the image block, with which the image is to be divided, but also the number and the locations of image blocks resulting from the division.

The controller 51 provides the operation cores 531 inside each of the operation core sets 53 with arithmetic algorisms to be executed and block location information for use in specifying the locations of the image blocks to be processed by the each operation core set 53. As described above, the individual operation cores 531 inside one operation core set 53 execute identical arithmetic algorisms. The algorism executed by one operation core 531 is called a "thread", and the one operation core set 53 actuates a plurality of threads and performs "multi-thread processing" to execute the plurality of threads in parallel. The controller 51 controls the multi-thread processing executed by each of the operation core sets 53. Specifically, the controller 51 provides each of the operation cores 531 of the operation core sets 53 with an arithmetic algorism and block location information to actuate a thread to be executed by the each operation core 531 (step S104). Each of the operation cores 531 executes a process of generating printing data corresponding to, for example, a pixel group including one pixel or some pixels inside the image block, as one thread.

Each of the operation cores 531 included in one operation core set 53 calculates a storage location at which image data to be processed is stored in the device memory 57, in which the original image data is stored, on the bases of the provided block location information (step S105).

Unprocessed image data whose storage location has been specified in this way is read from the device memory 57 (step S106). Here, similarly to the data transfer in the DMA, once a beginning address and the number of the pieces of data are determined, the image data, having consecutive addresses on the device memory 57 and used in the plurality of threads executed by the respective plurality of operation cores 531, can be transferred in a lump as successive pieces of data (i.e., can be burst transferred), and thus, this configuration enables the image data to be data transferred at a high speed. In the device memory 57 in which the image data of a raster form is retained, pieces of image data arranged in one row in a raster direction can be burst transferred. In the case where one image block includes a plurality of pixels across a plurality of rows in the Y-direction, the burst transfer is carried out for each of pixel rows located at mutually different locations in the Y-direction.

Each of the operation cores 531 reads necessary unprocessed data from the device memory 57 to perform the arithmetic operation on the read unprocessed data in accordance with the specified arithmetic algorism, and then writes processed data onto the device memory 57. Examples of the data process executed by each of the operation cores 531 includes, but are not limited to, a color conversion process of converting RGB image data into image data based on ink colors of the printer 7 (step S107), a halftone process of converting pixel information represented by image data into ink amounts (step S108), a format conversion process of conversing data into printing data having a format usable by the printer 7 (step S109). All of these processes, however, may not be executed, and further, one or more processes other than these processes may be included.

These data process are executed by each of the operation cores 531 in parallel, and as a result, in the operation core set 53, pieces of processed data corresponding to process target image blocks are generated and written onto the device memory 57. In this way, pieces of processed data corresponding to the respective image blocks are stored and retained in the device memory 57 (step S110).

An operation core set 53 transmits a processing completion notification to the controller 51 when the process on one image block has been completed. In response to this notification, when at least one unprocessed image block remains, the controller 51 provides the relevant operation core set 53 with block location information for specifying one of the at least one unprocessed image block. Upon receipt of the block location information, the relevant operation core set 53 newly executes the arithmetic process on the unprocessed image block. In this way, processing on each of the image blocks proceeds. Finally, pieces of processed data corresponding to all of the image blocks, that is, printing data representing the entire image is stored in the device memory 57. The printing data having been generated in this way is transferred to the main body memory 33 (step S111).

The controller 51 transmits a processing completion notification to the CPU 31. Upon receipt of this notification, the CPU 31 outputs the printing data stored in the main body memory 33 to the printer 7 (step S112). Subsequently, the printer 7 executes a printing job based on the printing data to print the image.

In order to efficiently perform processing on the image data using the GPU card 5, it is necessary to allow the block size of the image block Ib to be suitable for the processing ability of the operation core set 53 (the number of operation cores, the structure of arithmetic devices incorporated therein, and the like). That is, the size of the image block Ib is preferably to be determined so as to enable arithmetic resources of the operation core set 53 to be most efficiently utilized.

Figure 6:
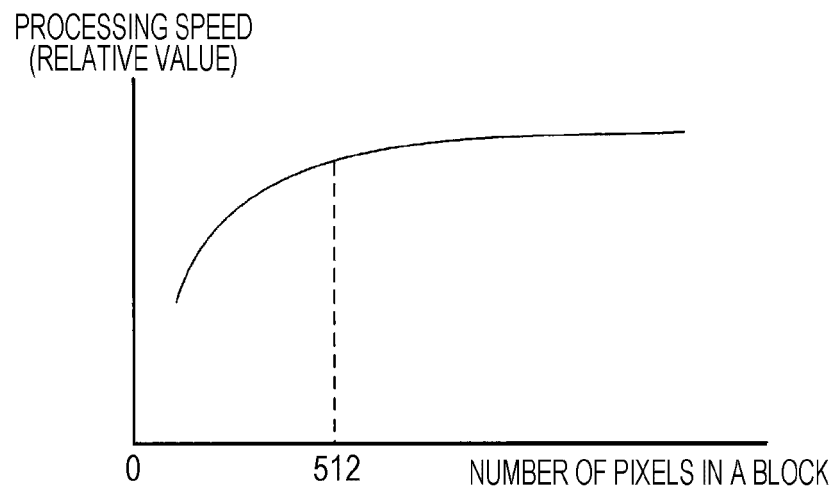
FIG. 6 is a first figure illustrating an example of a relation between a block size and a processing speed in a GPU.
Figure 7:
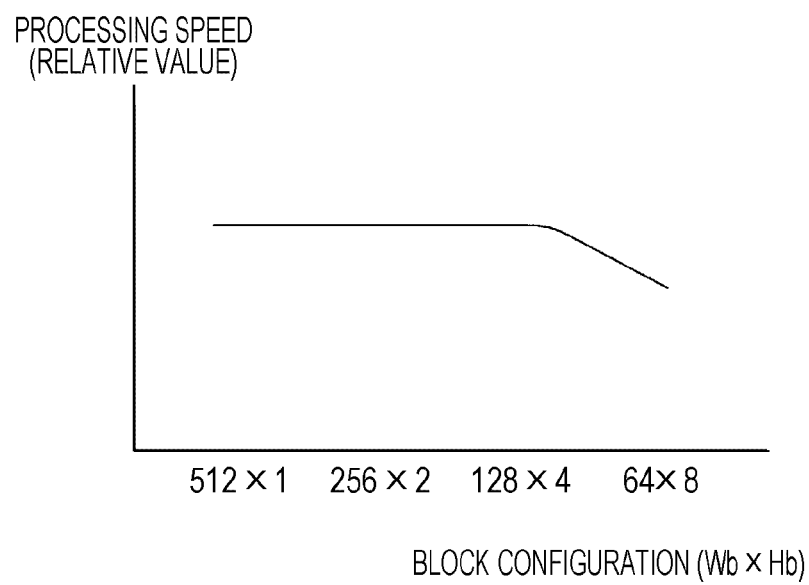
FIG. 7 is a second figure illustrating an example of a relation between a block size and a processing speed in a GPU.

FIGS. 6 and 7 are diagrams each illustrating an example of the relation between a block size and a processing speed in a GPU. More specifically, FIG. 6 illustrates an example of the results of actual measurements of the change of a processing speed of a GPU that is caused to execute multi-thread processing while the number of pixels included in one image block. FIG. 7 illustrates an example of the results of actual measurements of the change of a processing speed of the GPU that is caused to execute multi-thread processing while an X-direction block size and a Y-direction block size of one image block are changed. These are exemplified results of actual measurements with respect to commercially available GPU products each of which was provided with optionally selected dummy image data and was caused to execute arithmetic operation. In the results of the actual measurements, although specific resulting numerical values were different from one another due to the differences among hardware configurations of the individual products, approximately the same trend was observed.

As shown in FIG. 6, the relative processing speed increases as the number of pixels included in one image block increases. It is shown that parallel processes on a large number of pixels by one operation core set 53 achieves the increase of the processing speed as the entire image. In this regard, however, it is shown that there is a trend that, when the number of the pixels is increased more than or equal to a certain number, the increase of the processing speed slows down and enters a saturation state.

In a certain product, the increase of the processing speed was saturated when the number of pixels constituting one image block has come to approximately 512, and thereafter, any large increase was not observed in the processing speed even though the size of the image block was further increased. The reason is considered to be that block sizes exceeding the number of pixels that one operation core set 53 is capable of concurrently processing were set.

Meanwhile, when the measurements of processing speeds were made under a condition in which the number of pixels included in one image block was fixed to 512 pixels, and the block configuration, that is, the combination of an X-direction block size and a Y-direction block size, was sequentially changed, as shown in FIG. 7, it was observed that, in a region where the block size in the raster direction (the X-direction) is large, the processing speed was constant, and with the decrease of the block size in the raster direction, the processing speed was decreased. The reason is considered to be that a data row that can be transferred in a lump from the device memory 57 is shortened along with the shortening of a raw of pixels successively arranged in the raster direction, and as a result, the increase of a time spent in the data transfer causes the processing speed to decrease.

Thus, in order to allow the processing by the GPU card 5 to operate at a high speed, it is necessary to set image blocks each having a block size suitable for the processing ability of the GPU card 5. Waiting for a data transfer from a memory device is likely to lead to waiting for an arithmetic operation, and thus, the block size is preferably larger. In the present embodiment, however, a block size having made as small as possible is preferably set within a scope in which the processing speed is not decreased because, as described below, when an image size is small, the increase of the block size causes waste pixels that are not originally needed to be subjected to processing to be additionally subjected to the processing. In the actual measurement example above, it can be said that, as a block configuration (Wb×Hb) of an image block, 512×1, 256×2, 128×4, or the like is suitable. Further, in order to allow the parallel processes to be efficiently performed, a configuration that allows processes on image data to be executable by a single arithmetic algorism and that does not cause any exceptional case where a particular process is needed is preferable.

Meanwhile, an image to be processed has various sizes. Thus, when, as shown in FIG. 3, the image Im is divided into the plurality of image blocks Ib, there may occur a case where it is difficult to set the sizes of all image blocks to the same size. Specifically, for example, in the case where the image size Wa in the raster direction (the X-direction) is not the integer multiple of the image block size Wb, when the image block Ib is sequentially allocated from the left end of the image Im, a problem in that the image end and the image block end do not correspond to each other at the right end of the image Im occurs.

In order to increase the processing speed in the GPU card 5, it is preferable to obtain and use successive pieces of data stored in the device memory 57 and perform the reading from the device memory 57 at a high speed using the burst transfer. In the case where the image size is the integer multiple of the block size, the above purpose is achieved by sequentially obtaining, from the device memory 57, pieces of image data whose number is equal to the number of pixels that is associated with the block size from the beginning of the image data. In contrast, in the case where the image size is not the integer multiple of the block size, differences arise between the locations of delimiters of obtained image data and the locations of corresponding delimiters of the image blocks because fractions exist in the number of pixels included in a portion corresponding to the right end of the image. That is, as a result, it becomes difficult to correctly obtain image data that is needed for processing and that is in a unit of an image block.

In the aforementioned conventional technology, the above problem is intended to be eliminated by employing a method that allows dummy data to be added at the right end of a target image and thereby allows an apparent image size resulting from the expansion to correspond to the integer multiple of a block size. In this method, however, regardless of the content of the dummy data, the process that inserts such dummy data into image data of a raster form results in a large overhead and a cause that brings about the extension of a processing time. Further, processes are different in accordance with the relation between the image size and the block size, and this does not meet the requirement that any occurrence of exceptional processing is to be eliminated.

The present embodiment does not need additional processing for adding dummy data, and further, is configured such that processing change depending on whether or not the image size is the integer multiple of the block size is unnecessary. Specifically, the present embodiment is configured to, regardless of the relation between the image size and the block size, and regardless of whether or not an image block to be processed corresponds to the right end of a target image, enable the data transfer from the device memory 57 to the common memory 55 to be carried out in accordance with the same rule. Naturally, the problem in that the locations of delimiters of the image data and the locations of corresponding delimiters of the image blocks do not correspond to each other does not occur.

Figure 8:
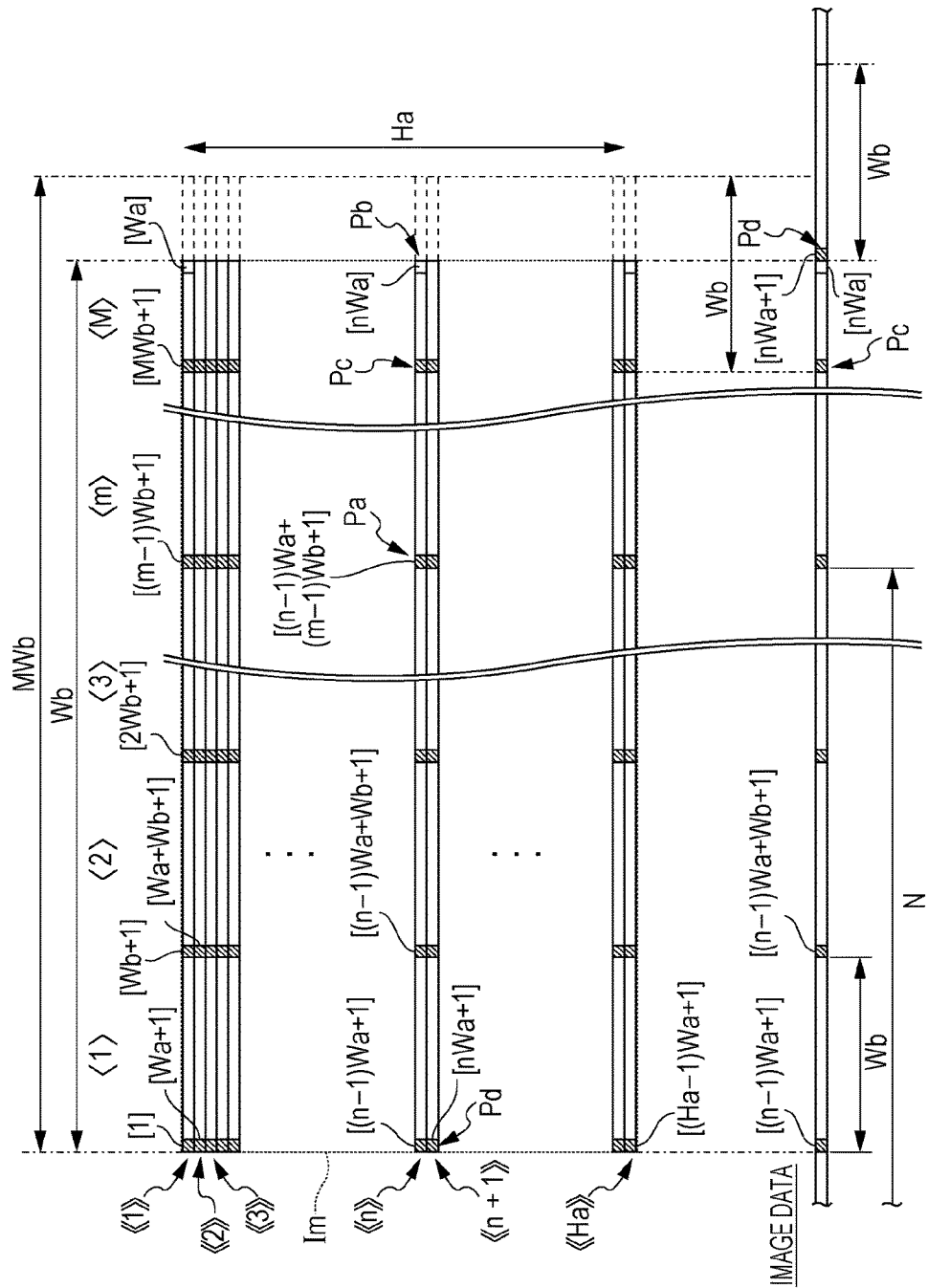
FIG. 8 is a principle diagram illustrating a rule of a data transfer from a device memory.

FIG. 8 is a principle diagram illustrating a rule of a data transfer from a device memory in the present embodiment. In the present embodiment, in order to efficiently carry out the data transfer, image data corresponding to a pixel row composed of pixels that are successively arranged in the raster direction within one image block is allowed to be obtained in a lump. The number of the pixels composing the pixel row obtained in a lump is always the same as the size Wb of one image block in the raster direction. The starting end location at the time of execution of a data transfer may be designated in such a way that the starting end location on the device memory 57 with respect to a pixel row corresponding to obtained image data always corresponds to the staring end location of a corresponding image block.

In FIG. 8, the image Im is represented as an aggregation of pixel rows extending in the X-direction. A square shaded with oblique lines represents a pixel corresponding to the starting end of a corresponding pixel row (this pixel being referred to a "starting end pixel" hereinafter). A character expression inside < > represents at what number a corresponding pixel row is located in the X-direction, this number being a serial number resulting from counting the number of the pixel rows from a pixel row located at the left end of the image Im in the X-direction. Further, a character expression inside << >> represents at what number a corresponding pixel row is located in the Y-direction, this number being a serial number resulting from counting the number of the pixel rows from a pixel row located at the top end of the image Im in the Y-direction. Moreover, a character expression inside [ ] represents at what number a corresponding pixel is located, this number being a serial number resulting from counting of the number of the pixels from a 1st pixel located at the upper-left position of the image Im on the image data of a raster form.

As shown in FIG. 8, in every two pixel rows adjacent to each other in the X-direction, the locations of starting end pixels of the respective adjacent pixel rows differ from each other on the image data by a pixel number corresponding to the block size Wb. Further, in every two pixel rows adjacent to each other in the Y-direction, the locations of starting end pixels of the respective adjacent pixel rows differ from each other on the image data by a pixel number corresponding to the block size Wa. As understood from this configuration, when a starting end pixel Pa of a pixel row that is an m-th pixel row in the X-direction and that is an n-th pixel row in the Y-direction is positioned at an N-th location on the image data, the location of the starting end pixel Pa, that is, "N", can be represented by the following generalized formula:

$$N=[(n-1)Wa+(m-1)Wb+1] \quad \text{(Formula 1)}$$

Here, "m" is a natural number not exceeding a minimum natural number among natural numbers each being larger than or equal to a value resulting from dividing the image size in the X-direction by the block size (i.e., Wa/Wb). Further, "n" is any natural number not exceeding the image size Ha in the Y direction.

When the block size in the Y-direction is assumed to be "1" to make it easy to understand the configuration, a natural-number combination (m, n), that is, the combination of the above natural numbers "m" and "n", becomes a parameter representing the location of a corresponding image block allocated on the Image Im. Thus, when block location information for specifying the location of an image block to be processed is provided to an operation core set 53 by the controller 51, the operation core set 53 can uniquely specify the above natural-number combination (m, n).

Accordingly, upon provision of image size information (Wa, Ha), block size information (Wb, Hb), and the block location information by the controller 51, the operation core set 53 can specify the location on the device memory 57 with respect to image data corresponding to an image block to be processed. That is, the starting end location N and the length Wb of the image block to be processed are specified by applying each piece of information to (Formula 1). These methods enable relevant pieces of image data to be read from the device memory 57 in a lump.

The data transfer based on (Formula 1) described above effectively functions regardless of the relation between the image size and the block size. Further, even when a target image block corresponds to the right end of the image, the data transfer based on (Formula 1) functions in the same way as in the case of any other image block. This reason will be further described below with reference to FIG. 8.

When a minimum natural member among natural members each being larger than or equal to (Wa/Wb) is represented by a character M, the number of pixel rows included in one raster line can be represented by the character M. In this regard, however, in one raster line, the termination end (the right end) of an M-th pixel row does not necessarily correspond to the termination end of the image Im. For example, a pixel Pb corresponding to the termination end (the right end) of an n-th raster line from the top end in the Y-direction is an nWa-th pixel on the image data, this nWa being a number resulting from counting the number of pixels from the beginning pixel. Further the M-th pixel raw may be a pixel including the pixel Pb, and a pixel Pc, that is, a starting end pixel, and composed of pixels the number of which is Wb and which includes one or more pixels subsequent to the pixel Pb, the starting end pixel. In this case, for example, an (nWa+1) th pixel following the pixel Pb on the image data corresponds to the starting end of an (n+1) th raster line.

As described above, in the case where the image size Wa is not the integer multiple of the block size Wb, as a result, the M-th pixel row in each of raster lines includes, at its tail end, at least one pixel included in a beginning partial portion of a next raster line. Such an M-th pixel row including the at least one pixel at the tail end results in a pixel row composed of pixels whose number is Wb, just like any pixel row other than the M-th pixel row in each of the raster lines. Accordingly, when one raster line composed of M pixel rows each having the length Wb, the length of the raster line results in a length MWb that is the integer multiple of the block size Wb.

As shown in dashed line in FIG. 8, this configuration is equivalent to a configuration in which a beginning partial portion of a next raster line is added to the tail end of each raster line, and thereby the image size Wa in the raster direction is apparently expanded to the length MWb. With this configuration, as a result, at least one pixel included in the beginning partial portion of the next raster line serves similarly to the dummy data in the conventional technology. Further, at least one pixel belonging to a next raster line is utilized as if it were the dummy data, and thus, processing for adding the dummy data is unnecessary.

In a simple method in which each pixel row is sequentially divided by a constant interval Wb from the beginning of the image data, a problem in that starting ends of image blocks and corresponding starting ends of pixel rows resulting from the division do not correspond to each other may occur. In (Formula 1), however, m is made a natural number not exceeding M, and thus, such a problem does not occur. That is, as shown in a bottom portion of FIG. 8, each of pixels positioned at locations subsequent to the location of the pixel Pc, which is the starting end pixel of the M-th pixel row, is represented by (Formula 1) described above, and further, a starting end pixel closest to the pixel Pc is a pixel Pd, that is, an (nWa+1) th pixel. This pixel Pd corresponds to the beginning of a raster line immediately below the raster line including the pixel Pc. That is, as a result, a pixel row subsequent to the pixel row whose starting end pixel is the pixel Pc is a pixel row whose starting end pixel is the pixel Pd, and thus, the discrepancies between delimiters of the pixel rows and corresponding delimiters of the image blocks do not occur.

In such a way described above, in the GPU card 5, image data within a range obtained on the basis of information included in the controller 51 and (Formula 1) is transferred from the device memory 57, and thereby image data needed for processing on pixels within each image block can be obtained in an appropriate manner.

Figure 9:
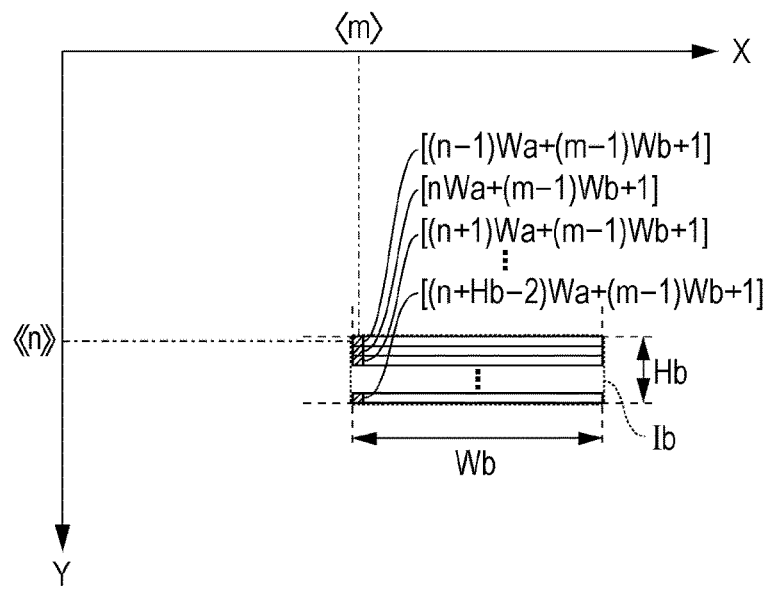
FIG. 9 is a diagram illustrating a concept in the case where a block size is larger than "1" in a Y-direction.

FIG. 9 is a diagram illustrating a concept in the case where the block size is larger than "1" in the Y-direction. In the above description, the block size in the Y-direction was assumed to be "1". In such a case, pieces of image data each associated with a corresponding one of all pixels within each image block are successively written, and thus, these pieces of image data can be consecutively obtained from the device memory 57 in a lump.

Meanwhile, there is a case where the block size Hb in the Y-direction is larger than "1", that is, each image block has a size equivalent to a plurality of pixels in the Y-direction. In this case, as far as the block size Wb in the X-direction is not larger than the image size Wa, pieces of image data each associated with a corresponding one of all pixels within each image block are written in the form in which the pieces of image data are distributed into pixel rows whose number is Hb on the device memory 57. A method for designating the starting end pixel of each pixel row in such a case will be described below.

As shown in FIG. 9, an image block Ib whose block size Hb in the Y-direction is larger than "1" is composed of a plurality of pixel rows arranged in the Y-direction. A character expression inside [ ] represents the location of a corresponding one of starting end pixels of these pixel rows, and as understood from this configuration, the locations of every two adjacent starting end pixels differ from each other by a pixel number equal to the image size Wa. Accordingly, upon specification of the location of, for example, the top starting end pixel within the image block Ib on the basis of the information included in the controller 51, all of other staring end pixels can be specified by handling the specified location of the top starting end pixel as an initial value, and sequentially adding the image size Wa. Further, the number of the pixel rows to be obtained is equal to the block size Hb. A configuration that, for required numbers of pixel rows whose starting end pixels have been specified in such a way as described above, allows the data transfer to be carried out for each of the pixel rows enables the acquisition of pieces of image data included in the entire target image block.

The configuration that allows partial image blocks allocated to the right end of a target image to be each given partial image data included in a corresponding one of next raster lines and serving similarly to the dummy data (this partial image data being referred to as "next image data" hereinafter) and that allows the partial image data to be added to each of the partial image blocks and thereby expands the target image causes the addition of data corresponding to originally unnecessary pixels to post-processing image data. The data corresponding to the unnecessary pixels, that is, an unnecessary portion, may be deleted before the post-processing image data is output to the main body memory 33 as printing data. In the present embodiment, as shown in FIG. 5, as the image data processing, the color conversion process, the halftone process, the format conversion process are executed. One or more processes other than these processes may be added. The unnecessary portion may be deleted for each of these processes, or the unnecessary portion may be allowed to remain at the stage of each of the processes and may be deleted, for example, at the time of execution of the data transfer from the device memory 57 to the main body 33.

Figure 10:
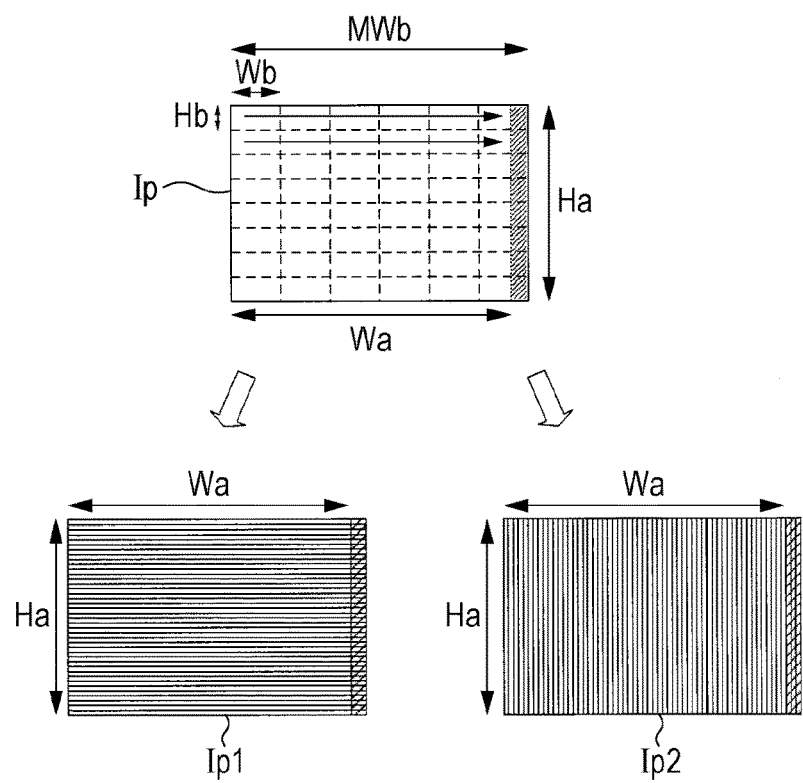
FIG. 10 is a diagram illustrating an example of a method for deleting an unnecessary portion from processed data.

FIG. 10 is a diagram illustrating an example of a method for deleting an unnecessary portion from processed data. Here, a method that allows the unnecessary portion to remain at the stages of the processes and be deleted at the execution of the transfer to the main body memory 33 will be described. In an upper portion of FIG. 10, an image Ip, that is, an image represented by processed image data, is an image resulting from rearranging image data having been processed for each image block. Arrows inside the image Ip indicate the raster direction in original image data.

In the case where, at the time of execution of the processing, pieces of next image data having the same function as that of dummy data have been each added to a corresponding one of image blocks located at the right end of the image Ip, the size of the image Ip is expanded to a size MWb larger than the original image size Wa. In the printing data output to the printer 4, an expanded portion shaded with oblique lines is unnecessary, and this unnecessary portion is deleted at the time of execution of the data transfer from the device memory 57 to the main body memory 33.

In a lower-left portion of FIG. 10, an image Ip1, that is, an example of an image resulting from processing that does not change the order of writing of the image data, is illustrated. In this case, when the data transfer from the device memory 57 to the main body memory 33 is carried out, data resulting from deleting data shaded with oblique lines at the right end of the image Ip1 and located at end tail portions of the respective raster lines is transferred. Meanwhile, in the case where processing for changing the order of writing of the image data in accordance with a printing proceeding direction of the printer 4 (that is, changing the raster direction from the horizontal direction to the vertical direction) is performed, as shown in a lower-right portion of FIG. 10, data included in raster lines and corresponding to an unnecessary portion shaded with oblique lines and located at the right end of an image Ip2 is not transferred. With this configuration, printing data having the original image size Wa is stored in the main body memory 33.

As described above, in the present embodiment, an image to be processed is processed in a unit of an image block using the GPU card 5. When image data to be processed is transferred from the device memory 57, a target pixel row is determined such that counting from the beginning of the image data of a raster form is performed to make an N-th pixel represented by (Formula 1) described above a starting end pixel of the pixel row, and successive pixels whose number is equal to the block size Wb in the raster direction are made pixels constituting the pixel row, and then, pieces of data corresponding to the pixel row are obtained in a lump as pieces of successive data.

According to this configuration, even in the case where the image size is not the integer multiple of the block size, part of image data included in original image data (i.e., next image data) is automatically added to each image block corresponding to pixels whose number is insufficient as if the part of image data were dummy data. Processing for grasping the relation between the image size and the block size in advance, and adding dummy data when needed is unnecessary, and thus, overhead caused by such processing can be eliminated. The next image data having been added in such a way serves similarly to the dummy data, and thus, it is unnecessary to change processing for each image block in accordance with the relation between the image size and the block size. Thus, though the use the GPU suitable for executing identical processes in parallel, high-speed data processing is achieved.

Further, the method for specifying the location of the data transfer by means of (Formula 1) can be applied to both of a case where the image size is the integer multiple of the block size and a case where the image size is not the integer multiple of the block size. Thus, because of uniform processing not depending on the relation between the image size and the block size, efficient data transfer is achieved. Moreover, since the size of the image block is not restricted by the image size, and thus, the size of the image block can be set in accordance with the processing ability of the operation core set 53, and the processing in the GPU card 5 can be optimized regardless of the image size. In the present embodiment, these features allow the processing ability of the GPU to be effectively utilized, thereby enabling higher speed processing to be achieved.

As described above, in the aforementioned embodiment, the device memory 57 functions as a "storage section" of the invention, and the controller 51 functions as a "control section" of the invention. Further, a pair of the operation core set 53 including the large number of operation cores 531, and the common memory 55 integrally functions as a "processing section". The image processing PC3 including the above components corresponds to a "image processing device" of the invention, and further, since all of the above components are mounted on the GPU card 5, the GPU card 5 also functions solo as the "image processing device" of the invention when a control program that executes the individual aforementioned processes is provided to the GPU card 5.

Further, when the whole of the printing processing system 1 shown in FIG. 1 is regarded as the "image processing device" of the invention, the printer 4 functions as a "printing section" of the invention.

It should be noted that the invention is not limited to the aforementioned embodiment, and various modifications can be made on the configurations described above within the scope not departing the gist of the invention. For example, in the aforementioned embodiment, when the GPU card 5 including the "storage section", the "processing section", and the "control section" of the invention is attached into the image processing PC3, the image processing PC3 functions as the "image processing device". Instead of this configuration, as described subsequently, a configuration that allows the GPU card to be mounted at the printer side and allows the printer to function as the "image processing device" of the invention can be made.

Figure 11:
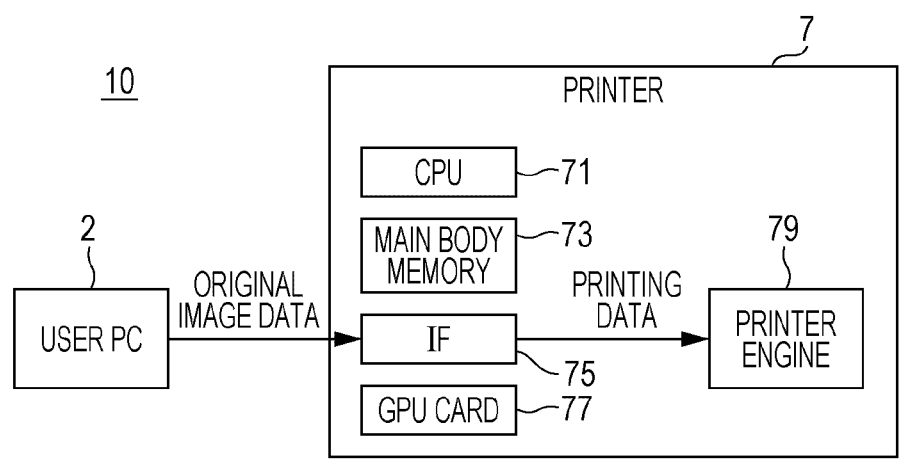
FIG. 11 is a diagram illustrating another embodiment of the invention.

FIG. 11 is a diagram illustrating another embodiment of the invention. In a printing processing system 10 according to this embodiment, a GPU card 77 is mounted in a printer 7. The printer 7 is capable of directly receiving original image data output from a user PC2, and executing printing. That is, the printer 7 includes a CPU 71, a main body memory 73, an interface 75, and a GPU card 77, and these components have functions similar to those of the corresponding components in the aforementioned embodiment. Further, the printer 7 further includes a printer engine 79, and this printer 79 performs printing on the basis of printing data.

In a commonly-used printer, a CPU, a memory, an interface, and the like are also included to perform processing on control instructions from the outside, and store printing data. Adding a GPU card to this configuration enables processing for generating the printing data from original image data to be performed at a high speed almost without increasing processing load on the CPU and the like at the printer side. This configuration can be embodied as an embodiment of the invention. In this case, the printer 7 functions as the "image processing device" of the invention, and the printer engine 79 functions as the "printing section" of the invention.

Further, in the aforementioned embodiment, the GPU card 5 including the "storage section", the "processing section", and the "control section" of the invention is configured as a card module attachable/detachable to/from the image processing PC3. These constituent elements of the invention, however, may be incorporated in the main body of the image processing PC3 (or the main body of the printer 7) in advance. Alternatively, the user PC2 may function as the "image processing device" by allowing the GPU card 5 to be incorporated in, or attached into, the user PC2 itself.

In the case where the invention is embodied as an attachable/detachable card module, such as in the aforementioned embodiment, the invention can be embodied using a commercially available GPU module. Since various general-purpose GPU modules and various GPU modules dedicated to image processing are commercially distributed, it is possible to optionally select and use a GPU module in accordance with a desired price and required performances. In order to embody the invention using the combination of a computer device and a GPU card each of which has versatility, a control program that allows the GPU card to execute the aforementioned processes may be installed in the computer device. That is, the invention can be embodied as an embodiment provided to users, that is, a control program that allows the GPU to execute the aforementioned processes, or a computer-readable recording medium recording such a control program therein.

Further, in the aforementioned embodiment, the size of each of image blocks resulting from dividing a target image is made changeable and settable. In this regard, however, as described, the block size is not restricted by the image size and can be determined in accordance with the processing ability of a GPU, and thus, the block size may be determined in advance in accordance with the processing ability of a GPU to be used. In this case, once the image size is specified, the allocation of individual image blocks can be made from the block size having been determined in advance. Similarly, an arithmetic algorism executed by each of the operation cores 531 may be determined in advance.

Further, the image processing device in the aforementioned embodiment includes the function of converting original image data having been generated by the user PC into printing data usable by the printer. In this regard, however, data processing targeted for the application of the invention is not limited to such processing for generating printing data. For example, the invention can be applied to processing for generating display data for use in the display of images on a display or the like by a display device. Particularly, in the display of moving images, high-speed processing is required, and the invention can be suitably applied to such a use.

The entire disclosure of Japanese Patent Application No. 2016-173387, filed Sep. 6, 2016 is expressly incorporated by reference herein.

What is claimed is:

1. An image processing device comprising:
a storage section configured to store therein image data representing an image and represented in a raster form;
a processing section configured to process the image data in a unit of an image block having a predetermined block size in a raster direction; and
a control section configured to provide the processing section with information related to the block size and an image size of the image,
wherein the processing section performs counting from a beginning of the image data to determine a starting end corresponding to an N-th pixel represented by N=(n−1)Wa+(m−1)Wb+1, and obtains, in a lump, from the storage section, pieces of image data included in the image data and corresponding to a pixel row including successive pixels whose number is equal to Wb to process the pieces of image data, and
wherein Wa denotes the image size in the raster direction, Wb denotes the block size in the raster direction, m denotes a natural number not exceeding a minimum natural number among natural numbers each being larger than or equal to a number resulting from dividing Wa by Wb, n denotes a natural number not exceeding the image size in an intersection direction intersecting with the raster direction, and unit of each of the image size and the block size is a pixel number.

2. The image processing device according to claim 1, wherein the storage section stores therein the image data having a structure in which a data row in which pixel information per pixel is sequentially arranged in order in accordance with order of an arrangement of pixels in one of raster lines is sequentially arranged in order in accordance with order of an arrangement of the raster lines.

3. The image processing device according to claim 1, wherein the processing section executes a plurality of threads in parallel to process pieces of image data which are included in the image data and each of which is associated with a corresponding one of pixels within the image block.

4. The image processing device according to claim 3, wherein the processing section includes a plurality of operation cores each of which executes one or more threads among the plurality of threads using the pieces of image data obtained from the storage section.

5. The image processing device according to claim 1, wherein the control section provides the processing section with information for use in specifying the image block to be processed.

6. The image processing device according to claim 1, wherein the control section allows the block size to be changeable and settable.

7. The image processing device according to claim 1, wherein, when the block size in the intersection direction is represented in a unit of a pixel number and is denoted by Hb (Hb being a natural number larger than or equal to "2"), the processing section obtains, from the storage section, pieces of image data included in the image data and corresponding to pixel rows whose number is equal to Hb, and among which locations of starting ends of every two adjacent pixel rows differ from each other by Wa.

8. The image processing device according to claim 1, further comprising a printing section configured to perform printing based on printing data that the processing section has processed the image data and has generated.

9. An image processing method comprising:
obtaining, by a processing section, image data that is stored in a storage section and that represents an image and is represented in a raster form; and
processing, by the processing section, the image data in a unit of an image block having a predetermined block size in a raster direction,
wherein the processing section performs counting from a beginning of the image data to determine a starting end corresponding to an N-th pixel represented by N=(n−1)Wa+(m−1)Wb+1, and obtains, in a lump, from the storage section, pieces of image data included in the image data and corresponding to a pixel row including successive pixels whose number is equal to Wb to process the pieces of image data, and
wherein Wa denotes the image size in the raster direction, Wb denotes the block size in the raster direction, m denotes a natural number not exceeding a minimum natural number among natural numbers each being larger than or equal to a number resulting from dividing Wa by Wb, n denotes a natural number not exceeding the image size in an intersection direction intersecting with the raster direction, and unit of each of the image size and the block size is a pixel number.

10. A non-transitory computer-readable medium storing a control program executable by a device including a storage means configured to store image data therein, a processing section configured process the image data, and a control section configured to control the processing section, the control program comprising the processes of:

allowing the storage section to store therein image data representing an image and represented in a raster form;

allowing the processing section to obtain the image data from the storage section and process the obtained image data in a unit of an image block having a predetermined block size in a raster direction;

allowing the control section to provide the processing section with information related to the block size and an image size of the image, and in the obtaining of the image data from the storage section by the processing section, allowing the processing section to perform counting from a beginning of the image data to determine a starting end corresponding to an N-th pixel represented by $N=(n-1)Wa+(m-1)Wb+1$, and obtain, in a lump, pieces of image data included in the image data and corresponding to a pixel row including successive pixels whose number is equal to Wb, wherein Wa denotes the image size in the raster direction, Wb denotes the block size in the raster direction, m denotes a natural number not exceeding a minimum natural number among natural numbers each being larger than or equal to a number resulting from dividing Wa by Wb, n denotes a natural number not exceeding the image size in an intersection direction intersecting with the raster direction, and unit of each of the image size and the block size is a pixel number.

* * * * *